(12) United States Patent
Boers

(10) Patent No.: US 6,729,478 B1
(45) Date of Patent: May 4, 2004

(54) BICYCLE STORAGE ELEVATOR (75) Inventor: Arie Boers, Plymouth, MN (US)

(73) Assignee: Luna Technologies, Inc, Plymouth, MN (US)

( * ) Notice: Subject to any disclaimer, the term of this patent is extended or adjusted under 35 U.S.C. 154(b) by 0 days.

(21) Appl. No.: 09/718,739

(22) Filed: Nov. 22, 2000

(51) Int. Cl.[7] .................................................. A47F 7/00
(52) U.S. Cl. ....................................................... 211/18
(58) Field of Search ................................ 211/18, 22, 24, 211/17; 464/30, 40

(56) References Cited

U.S. PATENT DOCUMENTS

| | | | | |
|---|---|---|---|---|
| 826,131 A | * | 7/1906 | Weaver | 269/93 |
| 2,625,357 A | * | 1/1953 | Atkinson | 248/205 |
| 2,631,582 A | * | 3/1953 | Bensfield | 128/25 |
| 3,088,545 A | * | 5/1963 | Meyer | 187/6 |
| 3,750,347 A | * | 8/1973 | Homeyer | 51/206.5 |
| 3,770,133 A | * | 11/1973 | Kolker | 211/19 |
| 3,805,054 A | * | 4/1974 | Wolf | 240/70 |
| 3,872,972 A | | 3/1975 | Cummins et al. | 211/17 |
| 3,907,113 A | * | 9/1975 | Kropelnitski | 211/19 |
| 3,924,751 A | | 12/1975 | Ballenger | 211/17 |
| 3,966,170 A | * | 6/1976 | McKenna | 254/175.7 |
| 4,199,139 A | * | 4/1980 | Mahnke et al. | 272/118 |
| 4,280,606 A | * | 7/1981 | Taylor | 464/40 |
| 4,372,442 A | * | 2/1983 | Fleischauer | 198/790 |
| 4,456,246 A | * | 6/1984 | Szabo | 272/118 |
| 4,541,769 A | * | 9/1985 | Clemens | 414/633 |
| 4,634,118 A | * | 1/1987 | Jensen | 272/117 |
| 4,648,594 A | * | 3/1987 | Schleffendorf | 272/118 |
| 4,666,151 A | * | 5/1987 | Chillier | 272/134 |
| 4,697,809 A | * | 10/1987 | Rockwell | 272/118 |
| 4,700,944 A | * | 10/1987 | Sterba et al. | 272/117 |
| 4,775,146 A | * | 10/1988 | Stankovic | 272/118 |
| 4,907,798 A | * | 3/1990 | Burchatz | 272/134 |
| 4,921,242 A | * | 5/1990 | Watterson | 272/72 |
| 5,000,292 A | * | 3/1991 | Chapelain et al. | 187/1 R |
| 5,101,935 A | * | 4/1992 | LaBianca | 182/236 |
| 5,183,162 A | | 2/1993 | Ritzenthaler | 211/1.57 |
| 5,188,323 A | * | 2/1993 | David | 248/158 |
| 5,190,509 A | * | 3/1993 | Davison, Jr. | 482/100 |
| 5,211,614 A | * | 5/1993 | Henes | 482/102 |
| 5,290,214 A | * | 3/1994 | Chen | 482/137 |
| 5,294,006 A | | 3/1994 | Deschino | 211/18 |
| 5,302,161 A | * | 4/1994 | Loubert et al. | 482/8 |
| 5,417,633 A | * | 5/1995 | Habing | 482/97 |
| 5,474,189 A | | 12/1995 | Peterson | 211/18 |
| 5,518,477 A | * | 5/1996 | Simonson | 482/102 |
| 5,593,012 A | * | 1/1997 | Aho | 192/56.1 |
| 6,109,125 A | * | 8/2000 | Schubert et al. | 74/89.22 |
| 6,149,020 A | * | 11/2000 | Gumpel et al. | 211/119.01 |
| 6,223,862 B1 | * | 5/2001 | Barnes | 187/412 |
| 6,234,036 B1 | * | 5/2001 | Kopko | 74/89.22 |

* cited by examiner

Primary Examiner—Daniel P. Stodola
Assistant Examiner—Khoa Tran
(74) Attorney, Agent, or Firm—Dicke,Billig & Czaja, PLLC (57) ABSTRACT A storage apparatus for storing an object, such as a bicycle, in an elevated storage position. The storage apparatus includes an elongated track mountable to a wall, and a support mechanism for receiving the bicycle. A mounting assembly mounts the support mechanism to the elongated track such that the support mechanism can move along the track between a loading position, wherein the bicycle can be loaded onto the support mechanism, and a storage position, wherein the bicycle on the support mechanism is elevated relative to the loading position. A drive assembly is operable for moving the support mechanism between the loading and storage positions. The drive assembly includes a drive mechanism for preventing movement of the support mechanism between the loading and storage positions upon operation of the drive assembly when the object on the support mechanism exceeds a maximum weight limit of the storage apparatus. The mounting assembly includes first and second resilient members. In the storage position, the weight of the bicycle causes pivotal movement of the support mechanism relative to the elongated track and compression of the first and second resilient members, which causes binding of the support mechanism on the elongated track to secure the support mechanism in the storage position.

42 Claims, 6 Drawing Sheets

Fig. 6

BICYCLE STORAGE ELEVATOR

TECHNICAL FIELD

This invention relates generally to a storage apparatus. In particular, the present invention is a storage apparatus for lifting and storing large objects, such as bicycles, adjacent to a ceiling so as to afford maximum clearance beneath the stored bicycles so as not to interfere with objects or activity below. The storage apparatus employs a lifting drive mechanism that prevents overloading of the storage apparatus, and thereby provides for the safe and easy storage of bicycles.

BACKGROUND OF THE INVENTION

The storage of bicycles when not in use presents peculiar problems, especially when one considers that the typical bicycle is long, narrow and somewhat cumbersome. Moreover, the typical family generally has a bicycle for each member of the family, with some family members having more than one bike at their disposal. This is particularly true for family members that enjoy riding both "on road" (i.e., road bikes) and "off road" (i.e., mountain bikes) bicycles. The end result is that the typical family has a fairly large number of bicycles that need to be stored in a secure location when not in use. This secure bicycle storage location tends to be the family house garage where space is at a premium. The customary manner of storing bicycles in a garage has been to simply place the bicycles in a side-to-side relationship employing the kick stands of the bicycles for support or leaning the bicycles against a supporting wall of the garage. However, this approach takes up valuable garage floor space that may otherwise be needed to store other objects, such as the family car, lawn mower, snow blower, etc. As such, it is clearly desirable to relieve the garage floor space for utilization by these other objects. In other words, it is desirable to provide storage for bicycles, whereby a plurality of bicycles may be stored or positioned within the available storage space, but without consuming needed floor space.

One manner to store bicycles so as to relieve the garage floor space for utilization by other objects, is to mount hooks on the garage ceiling or on a supporting wall of the garage near the ceiling. The bicycles are then placed on these hooks, thereby providing floor space clearance beneath these stored bikes for utilization by other objects or other activities. Although this approach adequately stores the bicycles and relieves valuable storage floor space, there are drawbacks to this bike storage system. In particular, to place the bicycles on the hooks for storage requires a person to manually lift the bike above his or her head for placement on the storage hooks. Since the typical bicycle weighs between twenty and thirty pounds and is not optimally shaped for lifting (i.e., the typical bicycle is long, narrow and oddly shaped), the job of lifting the bike above ones head for placement on the storage hooks can be cumbersome at best and down right dangerous at worst. For example, lifting of the bicycle above ones head for placement on the storage hooks may lead muscle strains, back pain or other injuries. Moreover, some individuals, such as children and smaller adults, may be incapable of lifting the bicycle high enough for placement on the storage hooks.

There is a need for an apparatus for storing large objects, such as bicycles. In particular, there is a need for a storage apparatus that can store bicycles adjacent to the ceiling of a storage facility, such as a garage, to afford maximum floor space clearance beneath the stored bicycles so as not to interfere with objects and activity below. The storage apparatus should obviate the need for a person to lift a bicycle above his or her head to store the bicycle. Moreover, the bicycle storage apparatus should prevent the storage apparatus from being overloaded, thereby providing for the safe storage of bicycles when not in use. Lastly, the bicycle storage apparatus should be relatively easy and inexpensive to manufacture.

SUMMARY OF THE INVENTION

The present invention is a storage apparatus for storing an object, such as a bicycle, in an elevated storage position. The storage apparatus includes an elongated track mountable to a wall, and a support mechanism for receiving the bicycle. A mounting assembly mounts the support mechanism to the elongated track such that the support mechanism can move along the elongated track between a loading position, wherein the bicycle can be loaded onto the support mechanism, and a storage position, wherein the bicycle on the support mechanism is elevated relative to the loading position. A drive assembly is operable for moving the support mechanism between the loading and storage positions. The drive assembly includes a drive mechanism for preventing movement of the support mechanism between the loading and storage positions upon operation of the drive assembly when the object on the support mechanism exceeds a maximum weight limit of the storage apparatus.

In one aspect of the present invention, the drive assembly includes a cable and a drive drum rotatably mounted to the elongated track. The cable has first and second opposite ends fixed to upper and lower ends, respectively, of the elongated track. The cable, between its first and second ends, is coupled to the support mechanism. In addition, the cable, between its first and second ends, passes over a cylindrical drum surface of the drive drum to define a friction drive region between the drive surface and the cable. The friction drive region, when the bicycle on the support mechanism does not exceed the maximum weight limit of the storage apparatus, provides sufficient frictional interaction between the drum surface of the drum member and the cable, such that rotation of the drum member moves the cable to thereby move the support mechanism between the loading and storage positions. The friction drive region, when the object on the support mechanism does exceed the maximum weight limit of the storage apparatus, provides insufficient frictional interaction between the drum surface of the drum member and the cable, such that upon rotation of the drum member, the drum surface slips relative to the cable preventing movement of the support mechanism between the loading and storage positions.

In another embodiment, the present invention provides a storage apparatus for storing an object in an elevated storage position. The storage apparatus comprises an elongated track mountable to a wall, and a support mechanism for receiving a bicycle. The elongated track has a back side positioned adjacent to the wall and an opposite front side. The support mechanism has a front end located at the front side of the elongated track and a back end located at the back side of the elongated track. A mounting assembly mounts the support mechanism to the elongated track such that the support mechanism can move along the elongated track between a loading position, wherein the bicycle can be loaded onto the support mechanism, and a storage position, wherein the bicycle on the support mechanism is elevated relative to the loading position. The mounting assembly includes first and second resilient members. The first resilient member is mounted to the front end of the support mechanism. The second resilient member is mounted to the back end of the support mechanism. The first and second resilient members allow movement of the support mechanism along the elongated track between the loading and storage positions. In the storage position, the weight of the bicycle causes pivotal movement of the support mechanism relative to the elongated track and compression of the first and second resilient members, which causes binding of the support mechanism on the elongated track to secure the support mechanism in the storage position. A drive assembly of the storage apparatus is operable for moving the support mechanism between the loading and storage positions.

This storage apparatus for storing objects, such as bicycles, of the present invention is designed to store bicycles adjacent the ceiling of a storage facility, such as a garage, to afford maximum floor space clearance beneath the stored bicycles so as not to interfere with objects and activity below. The drive assembly of the storage apparatus moves the bicycles between the easily accessed loading position and the elevated storage position, thereby obviating the need for a person to lift a bicycle above his or her head to store the bicycle in an elevated position. Moreover, the drive mechanism of the drive assembly prevents the storage apparatus from being overloaded, thereby providing for the safe storage of bicycles when not in use. Lastly, the bicycle storage apparatus of the present invention is relatively easy and inexpensive to manufacture.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principals of the invention. Other embodiments of the present invention and many of the intended advantages of the present invention will be readily appreciated as the same become better understood by reference to the following detailed description when considered in connection with the accompanying drawings, in which like reference numerals designate like parts throughout the figures thereof, and wherein.

DETAILED DESCRIPTION OF THE PREFERRED EMBODIMENTS

Figure 1:
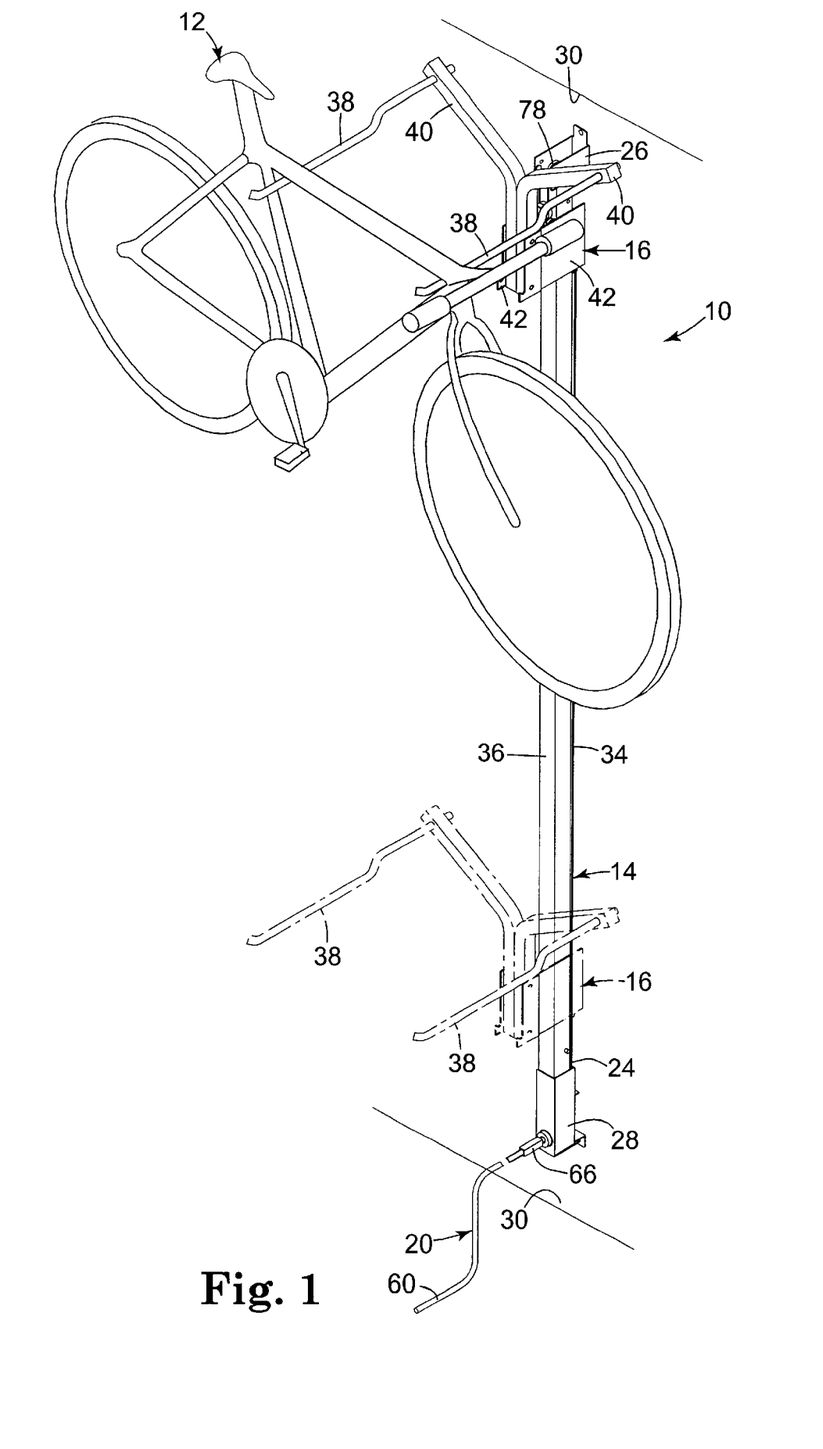
FIG. 1 is a perspective view of a bicycle storage apparatus in accordance with the present invention.
Figure 2:
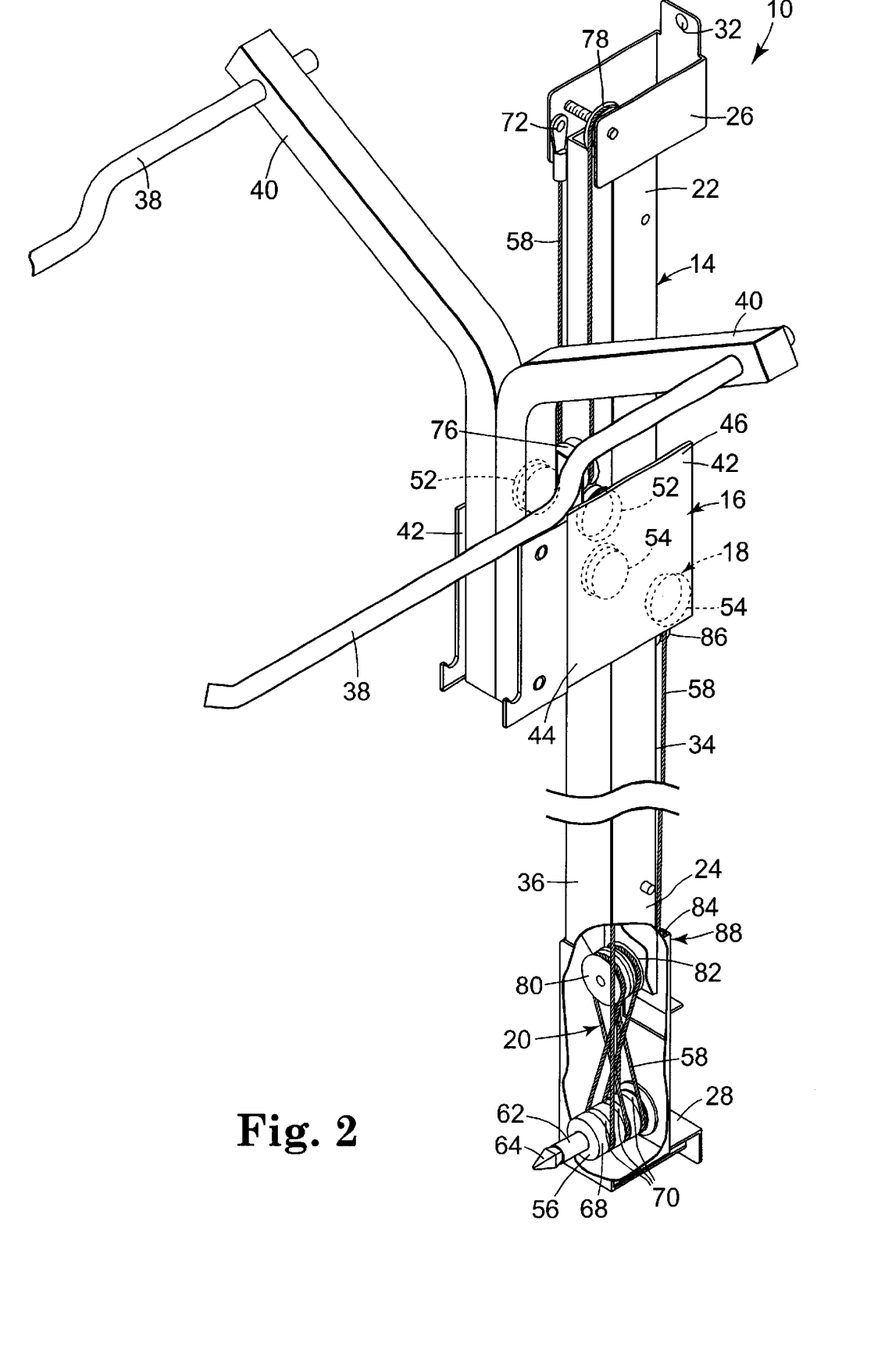
FIG. 2 is a partial enlarged perspective view of a bicycle support mechanism, support mechanism mounting assembly and support mechanism drive assembly of the storage apparatus shown in FIG. 1.

A storage elevator otherwise known as a storage apparatus 10 for storing an object, such as a bicycle 12, in an elevated storage position in accordance with the present invention is generally illustrated in FIGS. 1 and 2. For clarity, in FIG. 1, only one bicycle 12 is shown on the storage apparatus 10. However, it is to be understood that the storage apparatus 10 of the present invention is designed to support at least two bicycles 12 in a side-by-side relationship. As seen best in FIG. 2, the storage apparatus 10 includes an elongated track 14, a support mechanism 16 for receiving the bicycle 12, a mounting assembly 18 for mounting the support mechanism 16 to the elongated track 14, and a drive assembly 20 operable for moving the support mechanism 16 linearly along the elongated track 14.

As seen best in FIG. 2, the elongated track 14 has an upper end 22 and an opposite lower end 24. The upper and lower ends 22, 24 of the elongated track 14 include first and second mounting brackets 26 and 28, respectively, for mounting the elongated track 14 to a supporting wall 30 using threaded fasteners 32 (only one of which can be seen in FIG. 2). The elongated track 14 is defined by a metal rectangular shaped tube having a back side 34 positioned adjacent to but spaced from the supporting wall 30 and an opposite front side 36. In one preferred embodiment, the elongated track 14 and the first and second mounting brackets 26, 28 are made of steel.

As seen best in FIG. 2, the support mechanism 16 is defined by a pair of bicycle support arms 38 adapted to receive and support the bicycle 12. The bicycle support arms 38 are mounted to a pair of angled support elements 40 which are in turn mounted to a pair of spaced, parallel main support plates 42. The main support plates 42 extend to either side of the elongated track 14 to define a front end 44 and a back end 46 of the support mechanism 16. The front end 44 of the support mechanism 16 is located at the front side 36 of the elongated track 14, and the back end 46 of the support mechanism 16 is located at the back side 34 of the elongated track 14. In one preferred embodiment, the bicycle support arms 38, the angled support elements 40 and the main support plates 42 are made of metal such as steel. In addition, in one preferred embodiment, the bicycle support arms 38 have a soft rubber coating to prevent marring of the bicycle 12 when supported on the support arms 38 of the support mechanism 16.

As seen in FIGS. 2–5, the support mechanism 16 is mounted to the elongated track 14 by way of the mounting assembly 18. The mounting assembly 18 allows the support mechanism 16 to move linearly along the elongated track 14 between a loading position (shown in dotted lines in FIG. 1), wherein the support mechanism 16 is positioned adjacent the lower end 24 of the elongated track 14 and the bicycle 12 can be loaded onto the support arms 38 of the support mechanism 16; and a storage position (shown in solid lines in FIG. 1), wherein the support mechanism 16 is positioned adjacent the upper end 22 of the elongated track 14 and the bicycle 12 is elevated relative to the loading position.

Figure 3:
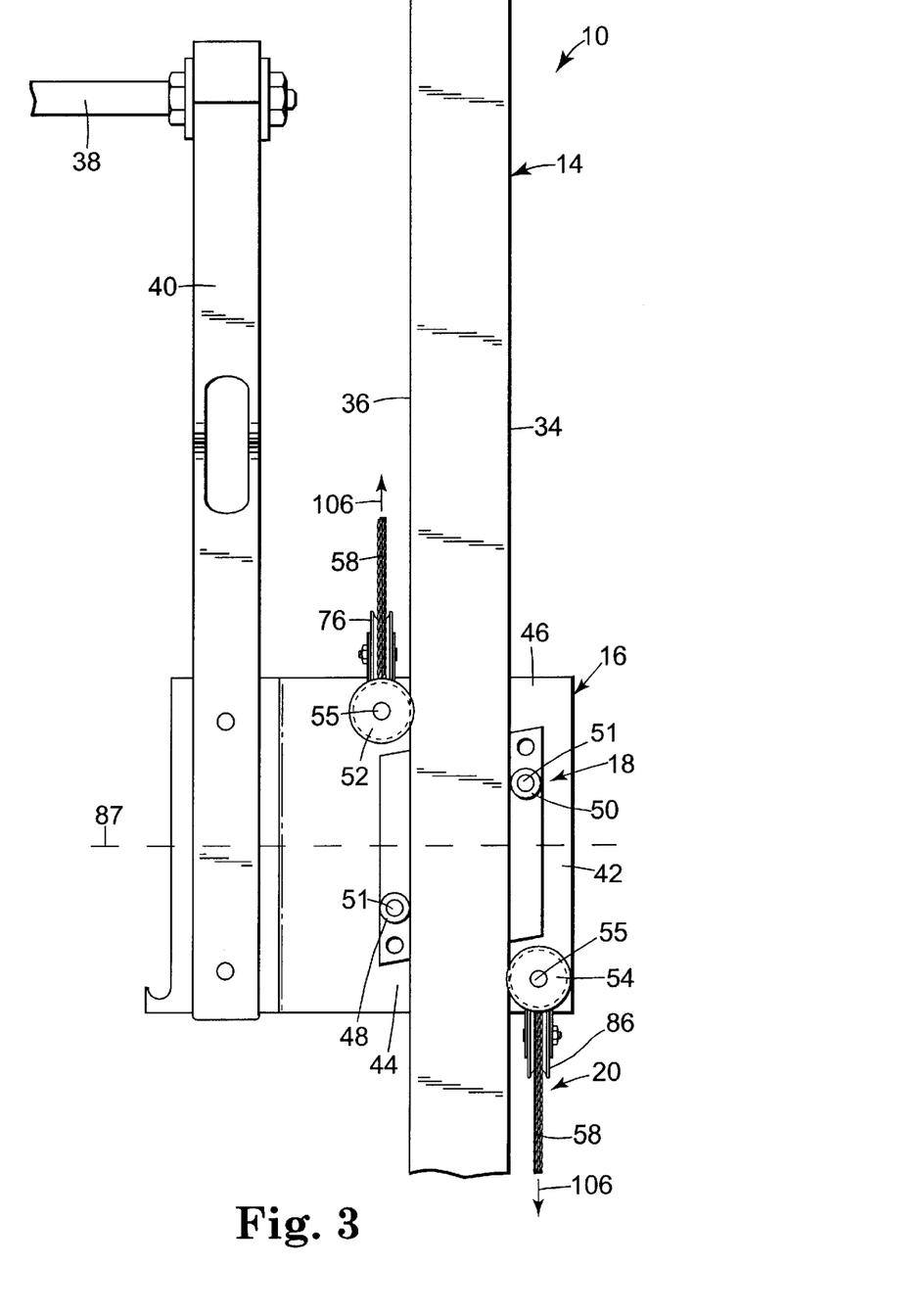
FIG. 3 is a partial enlarged side elevational view of the bicycle support mechanism and support mechanism mounting assembly of FIG. 2 shown as being linearly movable along an elongated track of the storage apparatus.
Figure 4:
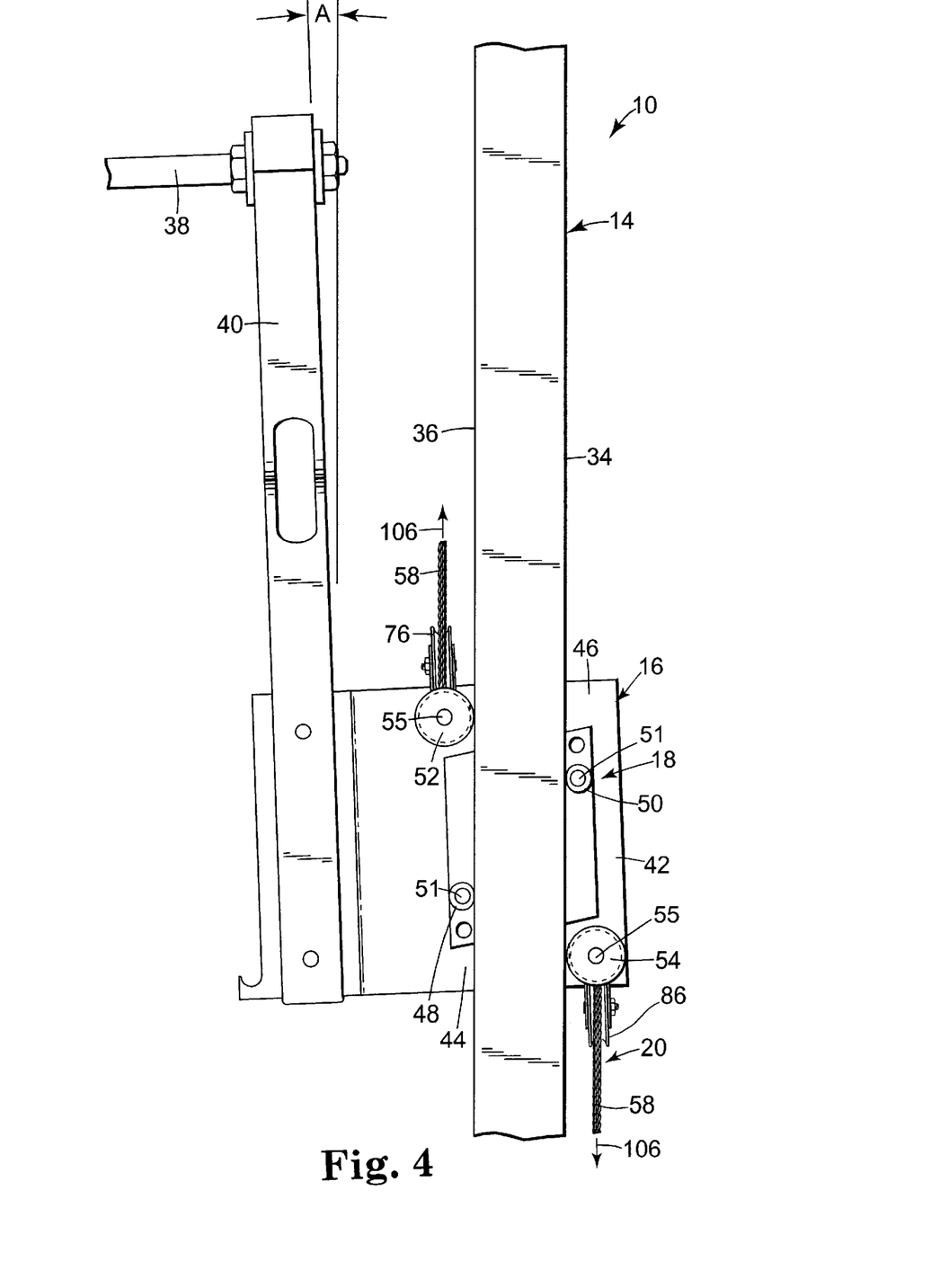
FIG. 4 is a partial enlarged side elevational view similar to FIG. 3 illustrating the storage position of the bicycle support mechanism and support mechanism mounting assembly in accordance with the present invention.
Figure 5:
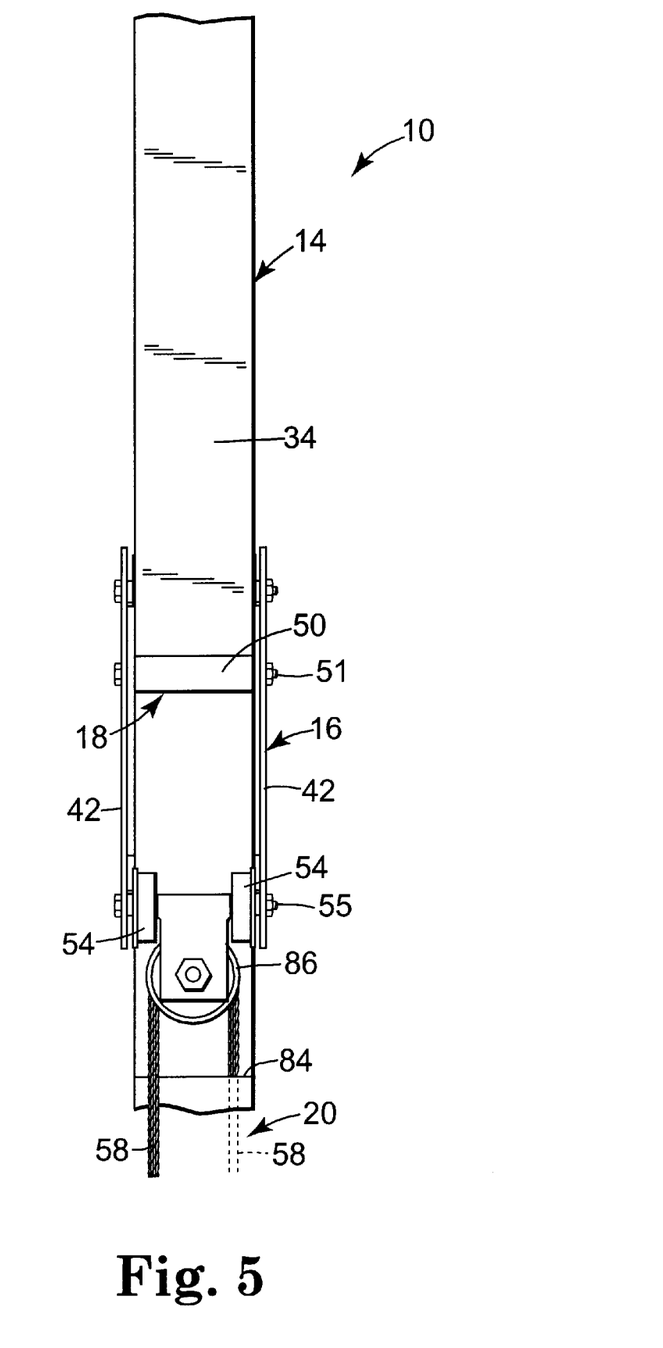
FIG. 5 is a partial back elevational view of the storage apparatus of FIG. 1 illustrating components of the support mechanism mounting assembly and the support mechanism drive assembly.

As seen best in FIGS. 3–5, the mounting assembly 18 includes a first resilient roller 48 rotatably mounted between the main support plates 42 at the front end 44 of the support mechanism 16. A second resilient roller 50 is rotatably mounted between the main support plates 42 at the back end 46 of the support mechanism 16 (see FIG. 5). The first and second resilient rollers 48 and 50 are identical and are rotatably mounted between the main support plates 42 in an identical manner via axles 51. In one preferred embodiment, the first and second resilient rollers 48, 50 are made of a resilient polymer, such as nylon.

As seen in FIGS. 2–5, the mounting assembly 18 further includes a first pair of spaced non-resilient rollers 52 rotatably mounted to the main support plates 42 at the front end 44 of the support mechanism 16. A second pair of spaced non-resilient rollers 54 are rotatably mounted between the main support plates 42 at the back end 46 of the support mechanism 16 (see FIG. 5). The first and second pairs of non-resilient rollers 52 and 54 are identical and are rotatably mounted between the main support plates 42 in an identical manner via axles 55. In one preferred embodiment, the first and second pairs of non-resilient rollers 52, 54 are made of metal, such as steel.

The first and second resilient rollers 48, 50 and the first and second pairs of non-resilient rollers 52, 54 support the support mechanism 16 on the elongated track 14 and allow the support mechanism 16 to move linearly along the elongated track between the loading and storage positions. As seen in FIGS. 3 and 4, the second resilient roller 50 is rotatably mounted to the support mechanism 16 in an elevated position relative to mounting position of the first resilient roller 48. In addition, the first pair of non-resilient rollers 52 are rotatably mounted to the support mechanism 16 in an elevated position relative to the mounting positions of the first and second resilient rollers 48, 50 and the second pair of non-resilient rollers 54. Moreover, the first and second resilient rollers 48, 50 are rotatably mounted to the support mechanism 16 in an elevated position relative to the mounting position of the second pair of non-resilient rollers 54. The purpose of this mounting arrangement for the rollers 48, 50, 52, 54 will become clear below.

As seen best in FIG. 2, the drive assembly 20 is operable to move the support mechanism 16 between the loading and storage positions. The drive assembly 20 includes a drive mechanism defined by a drive member otherwise known as a drive drum 56, a drive means defined by a flexible drive element otherwise known as a cable 58, and a crank member 60. The drive drum 56 is rotatably mounted to the second mounting bracket 28 adjacent the lower end 24 of the elongated track 14. The drive drum 56 is rotatably mounted to the second mounting bracket 28 by way of a drive rod 62 to which the drive drum 56 is fixed so as not to be movable relative to the drive rod 62. The drive rod 62 includes a socket fitting 64 (see FIG. 2) which is releasably engageable by a corresponding socket fitting 66 (see FIG. 1) on the crank member 60. Engaging the corresponding socket fitting 66 of the crank member 60 with the socket fitting 64 of the drive rod 62 allows a user to manually rotate the crank member 60 thereby rotating the drive drum 56. As seen in FIG. 2, the drive drum 56 includes a drive surface otherwise known as cylindrical drum surface 68 having three spaced grooves 70 the purpose of which will be made clear below.

Figure 6:
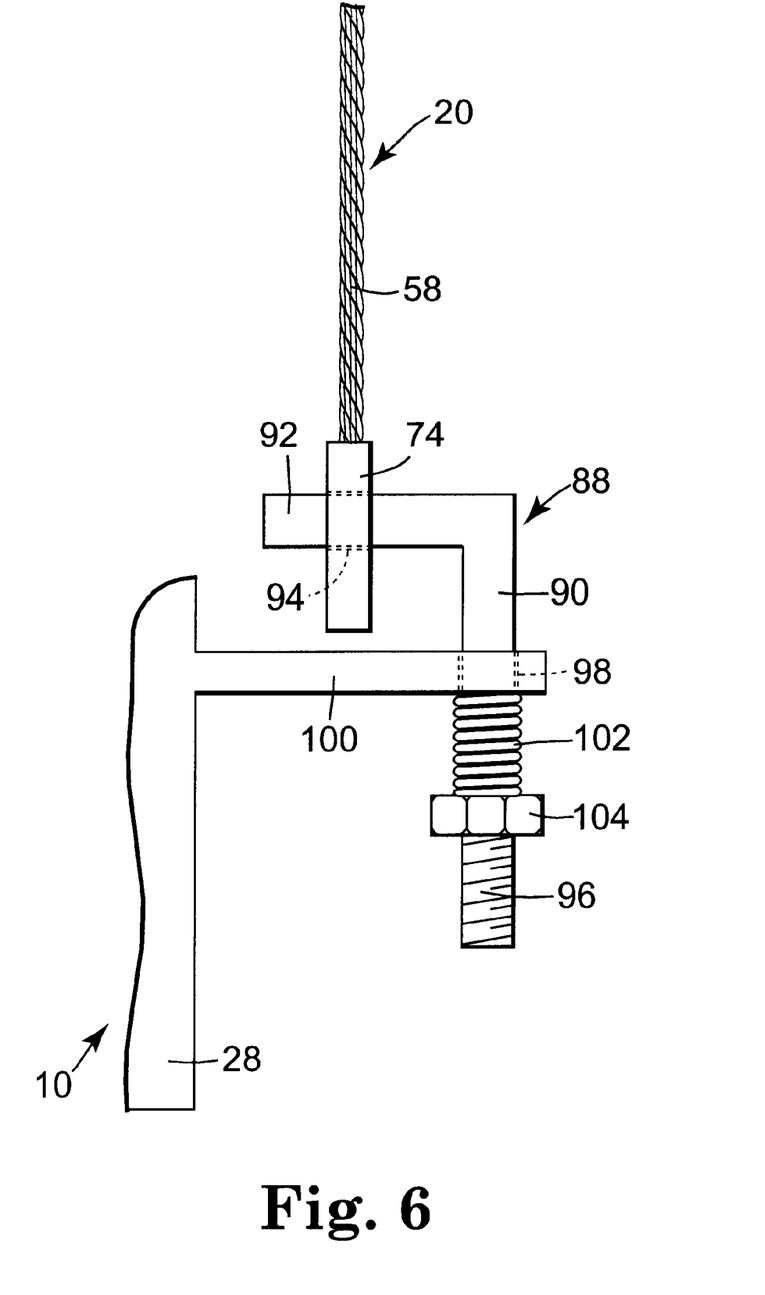
FIG. 6 is a partial sectional view illustrating a cable tensioning mechanism of the storage apparatus.

As seen in FIGS. 2–5, the cable 58 of the drive assembly 20 includes a first end 72 and an opposite second end 74 (see FIG. 6). The first end 72 of the cable 58 is fixed (i.e., anchored) to the first mounting bracket 26 adjacent to the upper end 22 of the elongated track 14. From there, the cable 58 passes down the front side 36 of the elongated track 14 and over a front pulley 76 rotatably mounted at the front end 44 of the support mechanism 16 between the first pair of non-resilient rollers 52. The cable 58 then passes back up the front side 36 of the elongated track 14 and over a track pulley 78 rotatably mounted to the first mounting bracket 26 adjacent to the upper end 22 of the elongated track 14. From there, the cable 58 passes down the interior of the elongated track 14 and then over the drum surface 68 of the drive drum 56 by way of the groove 70 nearest the socket fitting 64 of the drive rod 62. The cable 58 then passes over a first drive pulley 80 rotatably mounted to the second mounting bracket 28 at the lower end 24 of the elongated track 14. From there,
the cable 58 again passes over the drum surface 68 of the drive drum 56 by way of the middle groove 70. The cable 58 then passes over a second drive pulley 82 rotatably mounted to the second mounting bracket 28 at the lower end 24 of the elongated track 14 adjacent the first drive pulley 80. From there, the cable 58 again passes over the drum surface 68 of the drive drum 56 by way of the groove 70 furthest from the socket fitting 64 of the drive rod 62. As seen best in FIG. 2, the cable 58 crosses over itself as it passes between the grooves 70 of the drive drum 56 and the drive pulleys 80, 82. As seen best in FIG. 5, once the cable 58 has passed over the final groove 70 of the drive drum 56, the cable 58 passes up the interior of the second mounting bracket and out of an opening 84 in the second mounting bracket 28 near the lower end 24 of the elongated track 14. From there, the cable 58 passes up the back side 34 of the elongated track 14 and over a back pulley 86 rotatably mounted at the back end 46 of the support mechanism 16 between the second pair of non-resilient rollers 54 (see FIG. 5). The front and back pulleys 76, 86 are identical and are mounted to the support mechanism in an identical manner. Moreover as seen in FIG. 3, the front pulley 76 is mounted to the support mechanism 16 above a horizontal centerline 87 of the support mechanism, while the back pulley 86 is mounted to the support mechanism 16 below the horizontal centerline 87. The purpose of this will be made clear below. Once the cable 58 passes over the back pulley 86, the cable 58 passes back down the back side 34 of the elongated track 14 where the second end 74 of the cable 58 is attached (i.e., anchored) to the second mounting bracket 28 adjacent the lower end 24 of the elongated track 14 by way of a cable tensioning mechanism 88 (see FIG. 6).

As seen in FIG. 6, the cable tensioning mechanism 88 includes a fastener 90 having a hooked end 92 engageable with an aperture 94 at the second end 74 of the cable 58. The fastener 90 further includes a threaded end 96 that freely passes through an opening 98 in a mounting flange 100 on the second mounting bracket 28 at the lower end 24 of the elongated track 14. The threaded end 96 below the mounting flange 100 is adapted to receive a compression spring 102 and a threaded nut 104. Tightening the nut 104 on the threaded end 96 of the fastener 90 pulls the cable relative to the mounting flange 100 on the second mounting bracket 28 at the lower end 24 of the elongated track 14 thereby tensioning the cable about the drum surface 68 of the drive drum 56 and the pulleys 76, 78, 80, 82 and 86. In particular, tension on the cable 58 creates a friction drive region between cable 58 and the grooves 70 in the drum surface 68 of the drive drum 56. Specifically, this friction drive region is defined between the cable 58 and the grooves 70 where the cable 58 touches the grooves 70 in the drum surface 68 of the drive drum 56.

In practice, the cable 58 is tensioned using the cable tensioning mechanism 88 to a certain value (i.e., pounds of tension). In turn, this cable tension defines a maximum weight limit of the storage apparatus 10. The maximum weight limit is the maximum allowable weight of the bicycles 12 loaded onto the support mechanism 16. In one preferred embodiment, the cable 58 is tensioned using the cable tensioning mechanism to between eighty and one hundred twenty pounds. Specifically, in one preferred embodiment, the cable 58 is tensioned to one hundred pounds. In this one preferred embodiment, this cable tension translates to a maximum weight limit of between eighty and one hundred twenty pounds for the storage apparatus 10. Specifically, in this preferred embodiment, for one hundred pounds of cable tension, the storage apparatus 10 would have a maximum weight limit of eighty pounds. However, it should be understood that increasing or decreasing the cable tension of the cable 58 would increase or decrease, respectively, the maximum weight limit of the storage apparatus 10.

In operation, this cable tension on the cable 58 dictates the amount of friction in the friction drive region between the cable 58 and the grooves 70 in the drum surface 68 of the drive drum 56. In turn, the amount of friction in the friction drive region determines the maximum weight limit for the storage apparatus 10. The friction between the cable 58 and the grooves 70 in the drum surface 68 (i.e., friction in the friction drive region) is what causes movement of the cable 58, relative to the elongated track 14, upon rotation of the drive drum 56, via the crank member 60, and thereby linear movement of the support mechanism 16 along the elongated track 14 between the loading and storage positions. As such, if the weight on the support mechanism 16 is great enough (i.e., if the weight exceeds the maximum weight limit if the storage apparatus 10), the friction in the friction drive region will not be great enough to cause movement of the cable 58 upon rotation of the drive drum 56. In this instance, upon rotation of the drive drum 56 using the crank member 60, the grooves 70 in the drum surface 68 will simply slip along the cable 58 without imparting any movement to the cable 58 and thereby movement of the support mechanism 16. Therefore, as long as the weight (i.e., bicycles 12) on the support mechanism 16 is not greater than the maximum weight limit of the storage apparatus 10, the friction in the friction drive region will be sufficient to cause movement of the cable 58 upon rotation of the drive drum 56, and thereby linear movement of the support mechanism 16 along the elongated track 14 between the loading and storage positions.

In other words, when the bicycles 12 on the support mechanism 16 do not exceed the maximum weight limit of the storage apparatus 10, the friction drive region provides sufficient frictional interaction between the drum surface 68 of the drive drum 56 and the cable 58, such that rotation of the drive drum 56 moves the cable 58 about the pulleys 76, 78, 80, 82 and 86 to thereby move the support mechanism 16 between the loading and storage positions. When the bicycles 12 on the support mechanism 16 do exceed the maximum weight limit of the storage apparatus 10, the friction drive region provides insufficient frictional interaction between the drum surface 68 of the drive drum 56 and the cable 58, such that upon rotation of the drive drum 56, the drum surface 68 slips relative to the cable 58 preventing movement of the support mechanism 16 between the loading and storage positions. As such, the drive assembly 20 prevents movement of the support mechanism 16 between the loading and storage positions upon operation of the drive drum 56 when the bicycle(s) 12 on the support mechanism 16 exceed(s) the maximum weight limit (which is defined by the amount of tension in the cable 58) of the storage apparatus 10. Rotation of the crank member 60 in a clockwise direction causes the support mechanism 16 to move upwardly along the elongated track 14 between the loading position and the storage position. Rotation of the crank member 60 in a counter-clockwise direction causes the support mechanism 16 to move downwardly along the elongated track 14 between the storage position and the loading position.

As seen in FIG. 4, because of the arrangement of the first and second resilient rollers 48, 50 and the first and second pairs of non-resilient rollers 52, 54 as described above, in the storage position, the weight of the bicycle(s) 12 causes pivotal movement of the support mechanism 16 relative to the elongated track 14 and compression of the first and second resilient rollers 48 and 50. This movement of the support mechanism 16 to an angled state relative to vertical (as represented by angle "A" in FIG. 4) causes an increase in friction between the first and second resilient rollers 48, 50 and the front and back sides 44, 46 of the elongated track 14 and binding of the support mechanism 16 on the elongated track 14 to secure the support mechanism 16 in the storage position. As seen in FIG. 3, because of the mounting position of the front and back pulleys 76, 86, operation of the drive drum 56 causes the cable 58 to exert linear pulling forces (as represented by arrows 106), which tend to right the support mechanism (i.e., eliminating the angle "A") decompressing the first and second rollers 48, 50 and unbinding of the support mechanism 16 thereby allowing the support mechanism 16 to once again move linearly along the elongated track 14.

This storage apparatus 10 for storing objects, such as bicycles 12, in accordance with the present invention is designed to store bicycles adjacent the ceiling of a storage facility, such as a garage, to afford maximum floor space clearance beneath the stored bicycles so as not to interfere with objects and activity below. The drive assembly 20 of the storage apparatus 10 moves the bicycles 12 between the easily accessed loading position and the elevated storage position, thereby obviating the need for a person to lift a bicycle above his or her head to store the bicycle in an elevated position. Moreover, the interaction of drive drum 56 and the cable 58 of the drive assembly 20 prevents the storage apparatus from being overloaded, thereby providing for the safe storage of bicycles when not in use. Lastly, the bicycle storage apparatus 10 of the present invention is relatively easy and inexpensive to manufacture.

Although the present invention has been described with reference to preferred embodiments, workers skilled in the art will recognize that changes may be made in form and detail without departing from the spirit and scope of the invention.

What is claimed is:

1. An apparatus for storing an object in an elevated storage position, the storage apparatus comprising:

an elongated track mountable to a wall, the elongated track having an upper end and a lower end;

a support mechanism for receiving the object;

an assembly for mounting the support mechanism to the elongated track such that the support mechanism can move along the elongated track between a loading position, wherein the object can be loaded onto the support mechanism, and a storage position, wherein the object on the support mechanism is elevated relative to the loading position; and a drive assembly operable for moving the support mechanism between the loading and storage positions, the drive assembly including:

a drive mechanism including a drive drum rotatably coupled to the elongated track near the lower end, a first drive pulley rotatably coupled to the elongated track between the loading position of the support mechanism and the drive drum, and drive means coupled to the support mechanism and partially wound about the drive drum and the first drive pulley, the drive mechanism preventing movement of the support mechanism between the loading and storage positions upon operation of the drive assembly when the object on the support mechanism exceeds a maximum weight limit of the storage apparatus, wherein operation of the drive assembly when the weight of the object exceeds the maximum weight limit does not cause a failure of the drive mechanism which would prevent the operation of the drive assembly when the weight of the object does not exceed the maximum weight limit.

2. The storage apparatus of claim 1 wherein the drive mechanism is movable, such that, when the object on the support mechanism does not exceed the maximum weight limit of the storage apparatus, movement of the drive mechanism imparts movement of the support mechanism along the elongated track via the drive means.

3. The storage apparatus of claim 2 wherein the drive means is a flexible drive element.

4. The storage apparatus of claim 3 wherein the flexible drive element is a cable.

5. The storage apparatus of claim 4 wherein the cable has a first end anchored to the upper end of the elongated track and a second end anchored to the lower end of the elongated track, and wherein the cable is coupled to the support mechanism between the first and second ends.

6. The storage apparatus of claim 5 wherein the elongated track has a back side positioned adjacent to the wall and an opposite front side, wherein the support mechanism has a front end located at the front side of the elongated track and a back end located at the back side of the elongated track, and wherein between the first and second ends, the cable is coupled to the front end of the support mechanism.

7. The storage apparatus of claim 5 wherein the elongated track has a back side positioned adjacent to the wall and an opposite front side, wherein the support mechanism has a front end located at the front side of the elongated track and a back end located at the back side of the elongated track, and wherein between the first and second ends, the cable is coupled to the back end of the support mechanism.

8. The storage apparatus of claim 7 wherein between the first and second ends, the cable is further coupled to the front end of the support mechanism.

9. The storage apparatus of claim 8 wherein the support mechanism has a horizontal centerline, wherein the cable is coupled to the front end of the support mechanism above the horizontal centerline, and wherein the cable is coupled to the back end of the support mechanism below the horizontal centerline.

10. The storage apparatus of claim 8 wherein the front end of the support mechanism includes a front pulley, wherein the back end of the support mechanism includes a back pulley, and wherein between the first and second ends the cable passes over the front and back pulleys.

11. The storage apparatus of claim 10 wherein the upper end of the elongated track includes a track pulley, and wherein between the front pulley and the back pulley the cable passes over the track pulley.

12. The storage apparatus of claim 8 wherein the drive drum has a drive surface such that the cable, between the first and second ends, passes over the drive surface defining a friction drive region between the drive surface and the cable, the friction drive region, when the object on the support mechanism does not exceed the maximum weight limit of the storage apparatus, providing sufficient frictional interaction between the drive surface of the drive drum and the cable, such that rotation of the drive drum moves the cable to thereby move the support mechanism between the loading and storage positions, and the friction drive region, when the object on the support mechanism does exceed the maximum weight limit of the storage apparatus, providing insufficient frictional interaction between the drive surface of the drive drum and the cable, such that upon rotation of the drive drum, the drive surface slips relative to the cable preventing movement of the support mechanism between the loading and storage positions.

13. The storage apparatus of claim 12 wherein the drive assembly further includes:
a crank releasably engageable with the drive drum, the crank when engaged with the drive drum allowing a user to turn the crank thereby rotating the drive drum.

14. The storage apparatus of claim 12 wherein the drive surface is a cylindrical drum surface of the drive drum, and wherein between the first and second ends, the cable passes over the cylindrical drum surface at least one time.

15. The storage apparatus of claim 14 wherein between the first and second ends the cable passes over the cylindrical drum surface three times.

16. The storage apparatus of claim 15 wherein the cylindrical drum surface includes three grooves for receiving the cable to define the friction drive region between the drum surface and the cable.

17. The storage apparatus of claim 16 wherein the drive mechanism further includes:
a second drive pulleys rotatably mounted to the elongated track, wherein the cable, between the first and second ends, passes over the first and second drive pulleys.

18. The storage apparatus of claim 17 wherein the cable passes over one of the first and second drive pulleys between adjacent cable passes over the drum surface of the drive drum.

19. The storage apparatus of claim 14 wherein the drive assembly further includes:
means for tensioning the cable about the drum surface of the drive drum to create the friction drive region between the drum surface and the cable.

20. The storage apparatus of claim 19 wherein tensioning means includes a movable threaded fastener engageable with the second end of the cable.

21. The storage apparatus of claim 20 wherein the cable is tensioned to between 80 and 120 pounds.

22. The storage apparatus of claim 21 wherein the cable is tensioned to substantially 100 pounds.

23. The storage apparatus of claim 1 wherein the elongated track has a back side positioned adjacent to the wall and an opposite front side, wherein the support mechanism has a front end located at the front side of the elongated track and a back end located at the back side of the elongated track, and wherein the mounting assembly includes:
a first resilient roller rotatably mounted to the front end of the support mechanism; and
a second resilient roller rotatably mounted to the back end of the support mechanism, the first and second resilient rollers allowing movement of the support mechanism along the elongated track between the loading and storage positions upon operation of the drive assembly, in the storage position, a weight of the object causing pivotal movement of the support mechanism relative to the elongated track and compression of the first and second resilient rollers which causes binding of the support mechanism on the elongated track to secure the support mechanism in the storage position.

24. The storage apparatus of claim 23 wherein the second resilient roller is mounted to the support mechanism in an elevated position relative to the first resilient roller thereby allowing the pivotal movement of the support mechanism relative to the elongated track and the compression of the first and second resilient rollers which causes binding of the support mechanism on the elongated track to secure the support mechanism in the storage position.

25. The storage apparatus of claim 24 wherein the mounting assembly further includes:
   a first non-resilient roller rotatably mounted to the front end of the support mechanism; and
   a second non-resilient roller rotatably mounted to the back end of the support mechanism, the first and second non-resilient rollers allowing movement of the support mechanism along the elongated track between the loading and storage positions upon operation of the drive assembly.

26. The storage apparatus of claim 25 wherein the first non-resilient roller is mounted to the support mechanism in an elevated position relative to the first and second resilient rollers.

27. The storage apparatus of claim 26 wherein the first non-resilient roller and the first and second resilient rollers are mounted to the support mechanism in an elevated position relative to the second non-resilient roller.

28. The storage apparatus of claim 25 wherein the first non-resilient roller is a first pair of spaced non-resilient rollers, and wherein the second non-resilient roller is a second pair of spaced non-resilient rollers.

29. The storage apparatus of claim 1 wherein the object is at least one bicycle.

30. The storage apparatus of claim 29 wherein the at least one bicycle is two bicycles.

31. The storage apparatus of claim 1 wherein the maximum weight limit of the storage apparatus is between 40 and 120 pounds.

32. The storage apparatus of claim 31 wherein the maximum weight limit is 80 pounds.

33. An apparatus for storing an object in an elevated storage position, the storage apparatus comprising:
   an elongated track mountable to a wall, the elongated track having a back side positioned adjacent to the wall, an opposite front side, a upper end, and an opposite lower end;
   a support mechanism for receiving the object, the support mechanism having a front end located at the front side of the elongated track and a back end located at the back side of the elongated track;
   an assembly for mounting the support mechanism to the elongated track such that the support mechanism can move along the elongated track between a loading position, wherein the object can be loaded onto the support mechanism, and a storage position, wherein the object on the support mechanism is elevated relative to the loading position, the mounting assembly including:
   a first resilient member mounted to the front end of the support mechanism; and
   a second resilient member mounted to the back end of the support mechanism, the first and second resilient members allowing movement of the support mechanism along the elongated track between the loading and storage positions, in the storage position, a weight of the object causing pivotal movement of the support mechanism relative to the elongated track and compression of the first and second resilient members which causes binding of the support mechanism on the elongated track to secure the support mechanism in the storage position; and
   a drive assembly operable for moving the support mechanism between the loading and storage positions, the drive assembly including a drive drum rotatably coupled with the elongated track near the lower end, a drive pulley rotatably coupled with the elongated track between the loading position of the support mechanism and the drive drum, and drive means coupled to the support mechanism and partially wound about the drive drum and the drive pulley.

34. The storage apparatus of claim 33 wherein the second resilient member is mounted to the support mechanism in an elevated position relative to the first resilient member thereby allowing the pivotal movement of the support mechanism relative to the elongated track and the compression of the first and second resilient members which causes binding of the support mechanism on the elongated track to secure the support mechanism in the storage position.

35. The storage apparatus of claim 34 wherein the mounting assembly further includes:
   a first non-resilient member mounted to the front end of the support mechanism; and
   a second non-resilient member mounted to the back end of the support mechanism, the first and second non-resilient members allowing movement of the support mechanism along the elongated track between the loading and storage positions upon operation of the drive assembly.

36. The storage apparatus of claim 35 wherein the first non-resilient member is mounted to the support mechanism in an elevated position relative to the first and second resilient members.

37. The storage apparatus of claim 36 wherein the first non-resilient member and the first and second resilient members are mounted to the support mechanism in an elevated position relative to the second non-resilient member.

38. The storage apparatus of claim 37 wherein the first and second resilient members are first and second resilient rollers, respectively, rotatably mounted to the support mechanism.

39. The storage apparatus of claim 38 wherein the first and second-non-resilient members are first and second non-resilient rollers, respectively, rotatably mounted to the support mechanism.

40. The storage apparatus of claim 39 wherein the first non-resilient roller is a first pair of spaced non-resilient rollers, and wherein the second non-resilient roller is a second pair of spaced non-resilient rollers.

41. The storage apparatus of claim 33 wherein the object is at least one bicycle.

42. The storage apparatus of claim 41 wherein the at least one bicycle is two bicycles.

* * * * *